Patented Nov. 15, 1949

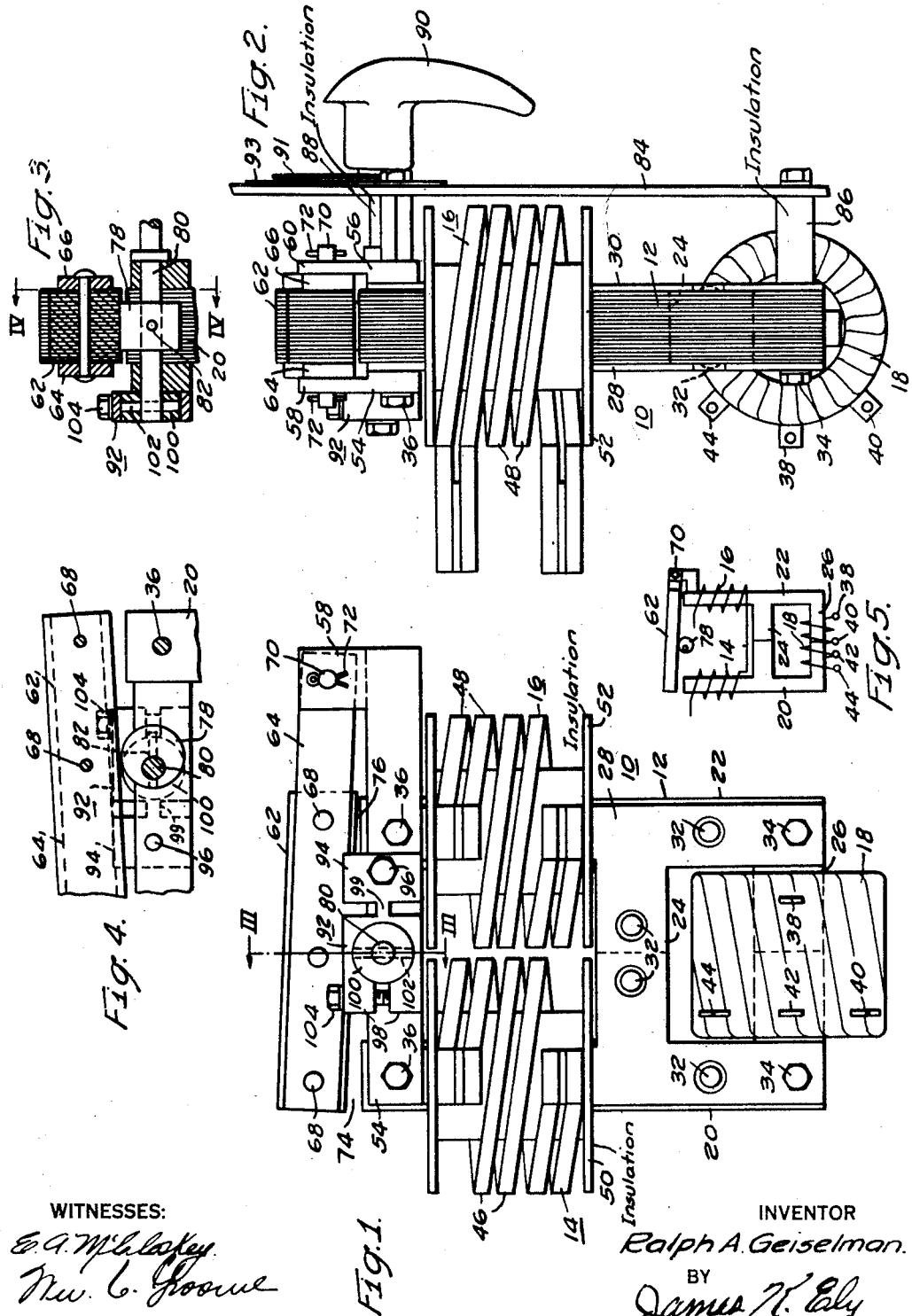

2,488,393

UNITED STATES PATENT OFFICE 2,488,393

REACTOR

Ralph A. Geiselman, Pittsburgh, Pa., assignor to Westinghouse Electric Corporation, East Pittsburgh, Pa., a corporation of Pennsylvania Application October 12, 1946, Serial No. 703,054

4 Claims. (Cl. 171—242)

This invention relates to electrical apparatus and in particular to reactors.

An object of this invention is to produce a saturating reactor having an adjustable direct-current magnetic circuit.

Another object of this invention is to produce a saturating reactor having a pivotally mounted leg in the direct-current magnetic circuit and provide for adjusting the positioning of the pivotally mounted leg to control the size of the air gap formed thereby.

A more specific object of this invention is to provide a saturating reactor having a pivotally mounted leg in the direct-current magnetic circuit with means for actuating the leg to control the size of the air gap formed thereby and means for preventing movement of the actuating means except under the influence of a positive actuating force.

Other objects of this invention will become apparent from the following description when taken in conjunction with the accompanying drawing, in which:

Figure 1 is a plan view in side elevation of a reactor embodying the teachings of this invention;

Fig. 2 is an end elevation of the reactor of Fig. 1;

Fig. 3 is a view in section taken along the line III—III of Fig. 1 of a part of the reactor;

Fig. 4 is a back view of a part of the reactor taken along the line IV—IV of Fig. 3; and Fig. 5 is a schematic view of the reactor of Fig. 1 illustrating the connections of the windings of the embodiment shown.

Referring to the drawing, this invention is illustrated by reference to the reactor 10 which in this instance comprises a core member 12 having a pair of direct-current windings 14 and 16 and an alternating-current winding 18 suitably disposed thereon. As illustrated, the core member 12 is formed of a substantially H-shaped member having parallel legs 20 and 22 and a cross member 24 disposed therebetween intermediate the ends thereof and a fixed leg 26 disposed to bridge the parallel legs 20 and 22 at the lower end thereof parallel to the cross member 24 to form a closed magnetic loop. The legs are all formed of laminated strips of magnetizable material and when assembled are held in position between side plates 28 and 30 by a plurality of intermediately disposed bolts 32 and end bolts 34 and 36.

As illustrated, the alternating-current winding 18 is positioned about the fixed leg 26 in the closed magnetic loop formed thereby. In practice, the alternating-current winding 18 is formed of a number of turns and is provided with a plurality of taps 38, 40, 42 and 44. By connecting tap 38 and varying the connection to the taps 40, 42 and 44 to a circuit (not shown) in which the reactor 10 is to be used a wide range of adjustment in the reactance of the reactor 10 can be obtained as will be explained more fully hereinafter.

The direct-current windings 14 and 16 illustrated, are identical, being formed of double conductors 46 and 48, respectively, of heavy copper and wound on coil forms 50 and 52, respectively, of insulating material and which are designed to fit about the free ends of the parallel legs 20 and 22 above the cross member 24. In practice, the turns of the windings 14 and 16 are adapted to be connected in series circuit relation as illustrated in Fig. 5 of the drawing for inducing a magnetic flux in the magnetic loop to be next described.

Adjacent the upper end of the core member 12, a pair of cross frame members 54 and 56 are secured against the side plates 28 and 30, respectively, as illustrated in Figs. 1 and 2 by the end bolts 36. The cross-frame members 54 and 56 are of non-magnetic material and are of sufficient length to extend a distance beyond the core member 12 at one side thereof, the extension of each frame member 54 and 56 being provided with an upwardly extending flanged end 58 and 60, respectively. An adjustable leg 62 of laminated material is carried between two side plates 64 and 66 of non-magnetic material being held therebetween by spaced bolts 68, the side plates 64 and 66 being of sufficient length to extend beyond the leg 62 and to be secured between the ends 58 and 60 of the cross-frame members 54 and 56 in a pivotally mounted relation. For this purpose a pin 70 is disposed in aligned openings provided in the cooperating ends of the cross-frame members 54 and 56 and the side plates 64 and 66 being retained in position therethrough by means of the cotter pins 72 through the ends of the pin 70.

As illustrated, the leg 62 is disposed to cooperate with the ends of the parallel legs 20 and 22 to provide adjustable air gaps 74 and 76, respectively, therewith. In order to effect a pivotal movement of the leg 62 about the pin 70, an eccentric member, such as a cam 78, is disposed for movement to rotationally engage the leg 62 to either force it in a clockwise direction about the pin 70 to enlarge the air gaps 74 and 76 or permit a counterclockwise movement of the leg 62 about the pin 70 to decrease the air gaps 74 and 76. In this embodiment, the cam 78 is carried on a shaft 80 being secured thereto by a set screw 82, the shaft being supported for rotational movement by the cross-frame members 54 and 56. As shown, the shaft 80 extends through the cross-frame members 54 and 56, the reason being described hereinafter.

Referring to Fig. 2 of the drawing, the assembled components of the reactor 10 are mounted on a panel 84 by means of the end bolts 34 and 36. The end bolts 34 and 36 extend through insulating spacer collars 86 and 88, respectively, and the panel 84. One end of the shaft 80 also extends through a suitable opening in the panel for receiving a handle 90 which may be secured thereto by any suitable means such as a set screw (not shown). The shaft 80 also carries a pointer or indicator 91 for cooperating with an indicator dial 93 carried on the panel 84 for indicating the position of the adjustable leg 62.

In order to prevent accidental movement of the cam 78, the other end of the shaft 80 is disposed to receive a brake member 92 as better shown in Figs. 1, 3 and 4. The brake member 92 is formed of friction material and comprises a solid block end 94 secured to the cross-frame member 54 by bolt 96 and a split block end 98 connected by a reduced section 99 of a size which will permit slight bending of the split end 98 relative to the solid end 94. The split block end 98 is disposed to frictionally engage an enlarged ring member 100 about the periphery thereof, the ring member being carried on the end of the shaft 80 and being secured thereto by the pin 102. As illustrated, the split block end 98 of the brake member 92 is biased into frictional engagement with the ring member 100 by tightening a bolt 104 in the ends of the split block 98. The degree of frictional engagement can thus be readily adjusted.

In operation, with the direct-current windings 14 and 16 connected in series circuit with each other and in the circuit (not shown) in which a quantity is to be regulated and with the alternating-current winding 18 connected in the control circuit of a suitable regulator (not shown), the reactance of reactor 10 is controlled by the current flowing in the direct-current windings 14 and 16. As the current flow in the direct-current windings 14 and 16 increases, the reactance of reactor 10 decreases. A suitable regulating circuit embodying the reactor 10 of this invention is illustrated in my application Serial No. 703,051, filed simultaneously herewith, now abandoned.

With the reactor 10 connected as described, the handle 90 is in a mid-position for normal operation. If it is desired to increase or decrease the regulated quantity, for example, current flow from a generator, the output circuit of which includes the direct-current windings 14 and 16, the handle is turned in a direction to adjust the saturation of the reactor 10. Thus if it is desired to decrease the regulated quantity, the handle 90 is turned in a direction to move the cam 78 against the frictional engagement of the brake 92 to permit pivotal movement of the movable leg 62 to decrease the size of the air gaps 74 and 76. As the air gaps are decreased, the saturation is so decreased that the voltage drop across the alternating-current winding 18 is increased to effect a regulating operation to decrease the excitation of the generator and consequently decrease the flow of regulated current therefrom.

Conversely, if it is desired to increase the flow of current to a new regulated value, the handle 90 is manually operated in the opposite direction to move the cam 78 in a direction to effect a pivotal movement of the movable leg 62 to increase the size of the air gaps 74 and 76. As the magnetic torque on the movable leg 62 is in a direction opposite to the force required for effecting such a pivotal movement, a larger force is required to overcome the torque and the friction of the brake 92 in effecting the pivotal movement to increase the size of the air gaps 74 and 76 than is required to effect a decrease in the size of the air gaps. As the size of the air gaps 74 and 76 is increased, the saturation of reactor 10 is increased with the result that the voltage drop across the alternating-current winding 18 is decreased to effect a regulating operation to increase the excitation of the generator and consequently increase the flow of regulated current therefrom.

The reactor 10 can be utilized for regulating over a wide range. This is apparent, for in addition to the adjustment obtained by actuating the cam 78 to vary the air gaps 74 and 76, the connection to the taps 40, 42 and 44 of the alternating-current winding 18 can be changed. In practice with the connections of the winding 18 made to taps 38 and 40 it is found that the range of adjustment is from 500 to 2500 ampere turns. If the connection to tap 40 is changed to tap 42, the range of adjustment then becomes 1000 to 4000 ampere turns; whereas if the connections are changed to taps 38 and 44, the range is from 2500 to 5300 ampere turns. Thus with the direct-current windings 14 and 16 formed of only four turns as illustrated in Fig. 1, it is possible to have an extended range of from 500 to 5300 ampere turns.

The air gaps 74 and 76 are readily adjusted by actuating the cam 78 as described. The brake 92 is efficient and capable of maintaining any given position for the movable leg 62 against the magnetic pull while permitting a positive adjustment of the air gaps when a positive adjusting force is manually applied to the handle 90. The reactor 10 is rugged and yet is compact, the construction thereof being so simple that the reactor can be readily duplicated. Further, since the direct-current windings 14 and 16 are heavy being of a size preferably larger than required for normal current carrying capacity being of the order of 1000 or more circular mils per ampere, the losses in the direct-current circuits including the windings 14 and 16 are negligible insofar as may be caused by the inclusion of the reactor.

I claim as my invention:

1. A reactor comprising, in combination, a core member comprising a pair of parallel legs and a cross member disposed intermediate the ends thereof, a fixed leg disposed parallel to the cross member to bridge the parallel legs at one end thereof and form a closed magnetic loop, another leg disposed for pivotal movement to bridge the parallel legs at the other end thereof and provide an air gap in the magnetic loop formed thereby, an alternating-current winding disposed on the fixed leg, a direct-current winding disposed in flux inducing relation with the magnetic loop having the air gap therein, an eccentric member disposed in rotational engagement with said another leg, means for actuating the eccentric member to effect a pivotal movement of said another leg to adjust the air gap, and means for frictionally holding the actuating means to prevent movement thereof and of said another leg except when a positive actuating force is applied to the actuating means.

2. A reactor comprising, in combination, a core member of substantially H-shape, a fixed leg disposed across an end of the H-shaped core member to provide a closed magnetic loop, another leg disposed for pivotal movement to bridge the other end of the H-shaped core member and provide an adjustable air gap in the magnetic loop formed thereby, an alternating-current winding disposed on the fixed leg, a pair of direct-current windings disposed on the opposite legs of the H-shaped core member at the end thereof that is bridged by said another leg, an eccentric member disposed in rotational engagement with said another leg, means for actuating the eccentric member to effect a pivotal movement of said another leg to adjust the air gap, and means for frictionally holding the actuating means to prevent movement thereof unless a positive actuating force is applied thereto.

3. A reactor comprising, in combination, a core member comprising a pair of parallel legs and a cross member disposed intermediate the ends thereof, a fixed leg disposed parallel to the cross member to bridge the parallel legs at one end thereof and form a closed magnetic loop, another leg disposed for pivotal movement to bridge the parallel legs at the other end thereof and provide an air gap in the magnetic loop formed thereby, an alternating-current winding disposed on the fixed leg, a direct-current winding disposed on each of the parallel legs between the cross member and said pivotally mounted another leg, the direct-current windings being connected in series circuit relation and disposed on the parallel legs for cooperating in inducing a directional flux in the magnetic loop having the air gap therein, an eccentric member disposed in rotational engagement with said another leg, means for actuating the eccentric member in rotational engagement with said another leg to effect a pivotal movement of said another leg to adjust the air gap, and a frictional brake disposed to cooperate with said actuating means for normally holding the actuating means to prevent movement thereof unless a positive actuating force is applied thereto, the frictional brake thereby preventing accidental movement of the eccentric member to change the air gap.

4. A reactor comprising, in combination, a core member comprising a pair of parallel legs and a cross member disposed intermediate the ends thereof, a fixed leg disposed parallel to the cross member to bridge the parallel legs at one end thereof and form a closed magnetic loop, a pair of substantially parallel frame members disposed to extend across the opposite sides of the parallel legs at the other end thereof, the frame members being of non-magnetic material and of a length to extend beyond one of the parallel legs, another leg having one end pivotally mounted between the extensions of the substantially parallel frame members and disposed for pivotal movement to bridge the parallel legs at the other end thereof and provide an air gap in the magnetic loop formed thereby, an alternating current winding disposed on the fixed leg, a direct-current winding disposed in flux inducing relation with the magnetic loop having the air gap therein, a shaft disposed to extend through and be supported by the substantially parallel frame members, an eccentric member carried by said shaft between the substantially parallel frame members disposed for rotational engagement with said another leg, means for effecting a positive rotation of the shaft and eccentric member carried thereon to effect a pivotal movement of said another leg engaged by the eccentric member to adjust the air gap, and a frictional brake disposed in cooperative relation with said shaft for normally preventing movement thereof unless a positive actuating force is applied thereto, the frictional brake thereby preventing accidental movement of the eccentric member to change the air gap.

RALPH A. GEISELMAN.

REFERENCES CITED

The following references are of record in the file of this patent:

UNITED STATES PATENTS

| Number | Name | Date |
|---|---|---|
| 2,127,237 | Sola | Aug. 16, 1938 |

FOREIGN PATENTS

| Number | Country | Date |
|---|---|---|
| 283,678 | Italy | Mar. 18, 1931 |
| 644,565 | Germany | May 12, 1937 |